US011169897B2

(12) United States Patent
Cirne et al.

(10) Patent No.: US 11,169,897 B2
(45) Date of Patent: *Nov. 9, 2021

(54) IDENTIFYING THE ROOT CAUSE OF AN ISSUE OBSERVED DURING APPLICATION EXECUTION

(71) Applicant: New Relic, Inc., San Francisco, CA (US)

(72) Inventors: Lewis Karl Cirne, Hillsborough, CA (US); Etan Lightstone, Pacifica, CA (US); Jason Snell, San Francisco, CA (US)

(73) Assignee: NEW RELIC, INC., San Francisco, CA (US)

( * ) Notice: Subject to any disclaimer, the term of this patent is extended or adjusted under 35 U.S.C. 154(b) by 75 days.

This patent is subject to a terminal disclaimer.

(21) Appl. No.: 16/658,764

(22) Filed: Oct. 21, 2019

(65) Prior Publication Data

US 2020/0050526 A1 Feb. 13, 2020

Related U.S. Application Data

(63) Continuation of application No. 15/433,248, filed on Feb. 15, 2017, now Pat. No. 10,459,818.

(Continued)

(51) Int. Cl.
*G06F 11/00* (2006.01)
*G06F 11/34* (2006.01)
(Continued)

(52) U.S. Cl.
CPC ...... *G06F 11/3409* (2013.01); *G06F 11/0706* (2013.01); *G06F 11/079* (2013.01);
(Continued)

(58) Field of Classification Search
CPC ............ G06F 11/3409; G06F 11/0706; G06F 11/0751; G06F 11/079
See application file for complete search history.

(56) References Cited

U.S. PATENT DOCUMENTS 8,225,291 B2 7/2012 Chung et al.
10,459,818 B2 * 10/2019 Cirne ................. G06F 11/0706
(Continued)

FOREIGN PATENT DOCUMENTS

| JP | 2014-115826 A | 6/2014 |
| JP | 2015-115018 A | 6/2015 |

OTHER PUBLICATIONS

Japan Patent Office, Official Notice of Rejection, JP Patent Application No. 2018-562730, dated Jul. 28, 2020, eight pages.
(Continued)

*Primary Examiner* — Philip Guyton
(74) *Attorney, Agent, or Firm* — Fenwick & West LLP (57) ABSTRACT

By monitoring requests to and from components of an application, an application analysis engine generates an inter-component graph for an application that identifies how the various components in the application are connected. When a performance issue is detected in association with the application, a traversal module traverses the inter-component graph to determine the possible execution paths that may have been the cause of the detected issue. The traversal module transmits requests to the correlation module to compare the metrics time series of the different components in the execution path with the detected issue. The correlation module compares metrics time series with the issue metric to identify correlations between execution patterns. The results of the correlation may be presented in a report that visually identify the root cause of the detected issues.

20 Claims, 9 Drawing Sheets

Related U.S. Application Data (60) Provisional application No. 62/297,031, filed on Feb. 18, 2016.

(51) Int. Cl.
*G06F 16/901* (2019.01)
*G06F 11/07* (2006.01)
*G06F 11/30* (2006.01)
*H04L 29/08* (2006.01)

(52) U.S. Cl.
CPC ...... *G06F 11/0751* (2013.01); *G06F 11/0781* (2013.01); *G06F 11/302* (2013.01); *G06F 16/9024* (2019.01); *H04L 67/02* (2013.01)

(56) References Cited

U.S. PATENT DOCUMENTS

| | | |
|---|---|---|
| 2006/0101308 A1 | 5/2006 | Agarwal et al. |
| 2008/0065928 A1 | 3/2008 | Suzuki et al. |
| 2010/0218030 A1 | 8/2010 | Bhatnagar et al. |
| 2013/0103832 A1 | 4/2013 | Cradick et al. |
| 2014/0143760 A1 | 5/2014 | Buxbaum et al. |
| 2014/0165064 A1 | 6/2014 | Takeda et al. |
| 2015/0172148 A1 | 6/2015 | Ishida et al. |
| 2015/0199254 A1 | 7/2015 | Vesepogu et al. |
| 2015/0332488 A1 | 11/2015 | Beck et al. |
| 2016/0378615 A1 | 12/2016 | Cohen et al. |
| 2017/0242663 A1 | 8/2017 | Abu Hassan et al. |

OTHER PUBLICATIONS

PCT International Search Report and Written Opinion, PCT Application No. PCT/IB2017/050851, dated May 23, 2017, 11 pages.
United States Office Action, U.S. Appl. No. 15/433,248, dated May 20, 2019, 9 pages.
United States Office Action, U.S. Appl. No. 15/433,248, dated Nov. 13, 2018, 12 pages.

\* cited by examiner

IDENTIFYING THE ROOT CAUSE OF AN ISSUE OBSERVED DURING APPLICATION EXECUTION

CROSS REFERENCE TO RELATED APPLICATIONS

This application is a continuation of U.S. Non-Provisional application Ser. No. 15/433,248, filed on Feb. 15, 2017, which claims the benefit of U.S. Provisional Application No. 62/297,031, filed on Feb. 18, 2016. Each application is hereby incorporated by reference in its entirety for all purposes.

BACKGROUND

This disclosure relates generally to monitoring applications, and in particular to identifying the root cause of an issue observed during application execution.

In today's complex software interdependent service environment, it's often difficult and time consuming to find the root cause of a problem affecting end users of an application. Typically, when monitoring an application, a large volume of performance data is collected for that application. Sifting through the overwhelming amount of data to find the exact cause of a problem, which may be in a component many layers removed from where the problem surfaced, is a time consuming and often heavily manual task.

The figures depict various embodiments of the present disclosure for purposes of illustration only. One skilled in the art will readily recognize from the following discussion that alternative embodiments of the structures and methods illustrated herein may be employed without departing from the principles of the disclosure described herein.

SUMMARY

By monitoring requests to and from components of an application, an application analysis engine generates an inter-component graph for an application that identifies how the various components in the application are connected. When a performance issue is detected in association with the application, a traversal module traverses the inter-component graph to determine the possible execution paths that may have been the cause of the detected issue. The traversal module transmits requests to the correlation module to compare the metrics time series of the different components in the execution path with the detected issue. In particular, the correlation module compares metrics time series with the issue metric to identify correlations between execution patterns. The results of the correlation may be presented in a report that visually identify the root cause of the detected issues. The report may identify the execution path from the level where the issue was detected to the root cause.

DETAILED DESCRIPTION

Figure 1:
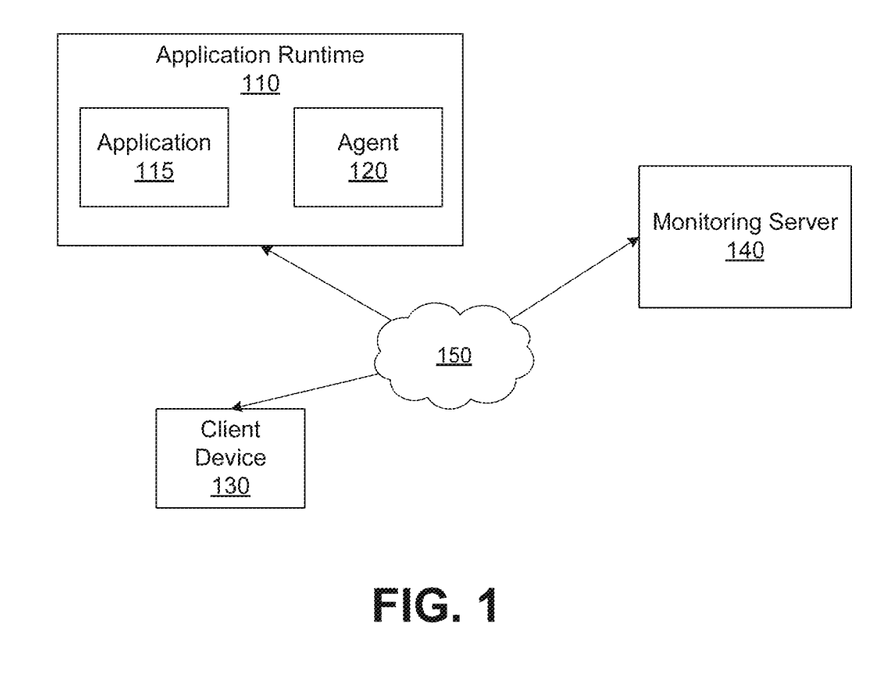
FIG. 1 illustrates a system environment for monitoring an application, according to one embodiment.

FIG. 1 illustrates a system environment for monitoring an application, according to one embodiment. In one embodiment, the environment includes the application runtime 110, a client device 130, and a monitoring server 140 communicating over a network 150.

The client device 130 includes one or more computing devices capable of receiving user input as well as transmitting and/or receiving data via the network 150. In one embodiment, a client device 130 is a conventional computer system, such as a desktop or laptop computer. Alternatively, a client device 130 may be a device having computer functionality, such as a personal digital assistant (PDA), a mobile telephone, a smartphone or another suitable device. A client device 130 is configured to communicate via the network 150. In one embodiment, a client device 130 executes an application allowing a user of the client device 130 to interact with the application runtime 110. For example, a client device 130 executes a browser application to enable interaction between the client device 130 and the application runtime 110 via the network 150. In another embodiment, a client device 130 interacts with the application runtime 110 through an application programming interface (API) running on a native operating system of the client device 130, such as IOS® or ANDROID™. Although a single client device 130 is shown in FIG. 1, any number of client devices 130 may interact with the application runtime 110 via the network 150.

The client device 130 is configured to communicate with the application runtime 110 via the network 150, which may comprise any combination of local area and/or wide area networks, using both wired and/or wireless communication systems. In one embodiment, the network 150 uses standard communications technologies and/or protocols. For example, the network 150 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 150 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 150 may be represented using any suitable format, such as hypertext markup language (HTML) or extensible markup language (XML). In some embodiments, all or some of the communication links of the network 150 may be encrypted using any suitable technique or techniques.

The application runtime 110 operates an application 115 and an agent 120. The application 115 may be any of a variety of types of mobile applications or web applications, and may represent a subset of operations of a client-server application. The application 115 operated by the application runtime 110 includes any server-side processes of a client-server application, such as retrieving and storing database content, generating user interfaces for rendering at the client device 130, performing functions requested at the client device 130, and communicating content to the client device 130 (e.g., over the network 150), while the client-side processes of the application include processes such as displaying content to a user and communicating requests to the application runtime 110. For example, the application runtime 110 serves a web page to a client device 130 for display to a user. Although a single application runtime 110 is shown in FIG. 1, the application runtime 110 may comprise one or more computing devices executing the functions of the application 115, and the environment may include any number of web servers operating any number of applications 115.

In one embodiment, the functionality of the application 115 is quantized into one or more transactions. Each transaction is a series of application components executed by the application runtime 110 in response to a request received from a client device 130. In one embodiment, the start of a transaction is defined as a time the application runtime 110 receives a request from a client device 130 (e.g., a request to send a portion of a webpage for display at the client device 130), while the end of the transaction is defined as a time the application runtime 110 returns a response to the request (e.g., sends the webpage to the client device 130). The end of the transaction may be a time the application runtime 110 begins sending the response, a time the application runtime 110 finishes sending the response, or otherwise defined relative to the response. In another embodiment, the start and end of the transaction are specified points within the application 115 and not necessarily defined relative to a request and response.

Each component of the transaction is executed within an execution thread maintained by the application runtime 110. Within each component, the application runtime 110 executes one or more methods. A transaction method represents a group of software statements or commands that together represent a discrete operation of the application 115. For example, one transaction method of the application 115 may be a database query, while another transaction method performs a calculation using the data retrieved from the database.

The application runtime 110 may execute the components asynchronously such that multiple methods may be executed simultaneously or during overlapping time periods. Some of the methods may also call or be called by other methods of the transaction. A first method that calls a second method of the transaction is referred to as a "parent" of the second method, while the second method is referred to as a "child" of the first method. As a child of the first method, the second method is not executed until after the first method calls the second method (e.g., after the first method has been completed), even if the first method is executed within a different thread than the second method. Some methods may also block components of the transaction, such that the execution of the component is paused while the blocking method is executed. For example, a first transaction component includes a first and third method and a second transaction component includes a second method, where the first method calls the second method and the second method calls the third method. While the second method is executing, the first component is blocked: no methods are executed on the first thread while the second method is being executed. When execution of the second method is completed, the third method is executed on the first thread.

The agent 120 monitors performance of the application 115, including processes running on the application runtime 110, response time of the application 115, transactions in the application 115, the effect of backend processes on performance of the application 115 at user devices, and/or other information. The agent 120 is a set of software modules executed by the application runtime 110 along with the application 115, and monitors the application 115 by injecting code into the application 115. The injected code is executed by the application runtime 110 when selected methods of application 115 are executed. The methods monitored by the agent 120 may be manually selected by a developer of the application 115 or an administrator of the application 115 or may be automatically selected by the agent 120. For example, the agent 120 may monitor every method of the application 115. When executed, the injected code generates metrics that specify, for each monitored method: an identifier of the method, the duration of the execution of the method, children and/or parents of the method, and whether the method blocks any other application components from executing.

The monitoring server 140 monitors performance of the application runtime 110. The monitoring server 140 may be hosted by an application monitoring service provider, and may monitor performance of any number of app servers. In one embodiment, the monitoring server 140 is hosted by New Relic®, Inc. and executes NEW RELIC® APM. To monitor the application runtime 110, the monitoring server 140 provides the agent 120 to the application runtime 110 and receives data from the agent 120. The monitoring server 140 receives reports from the agent 120 and formats data in the reports for analysis by an administrator of the application runtime 110, enabling the administrator to address any performance issues in the application 115. For example, the monitoring server 140 generates plots illustrating execution times of methods on a critical path in a transaction. Reporting the execution time of the methods on the critical path enables the administrator to identify methods with long execution times and determine methods to target for decreasing the transaction time.

Figure 2:
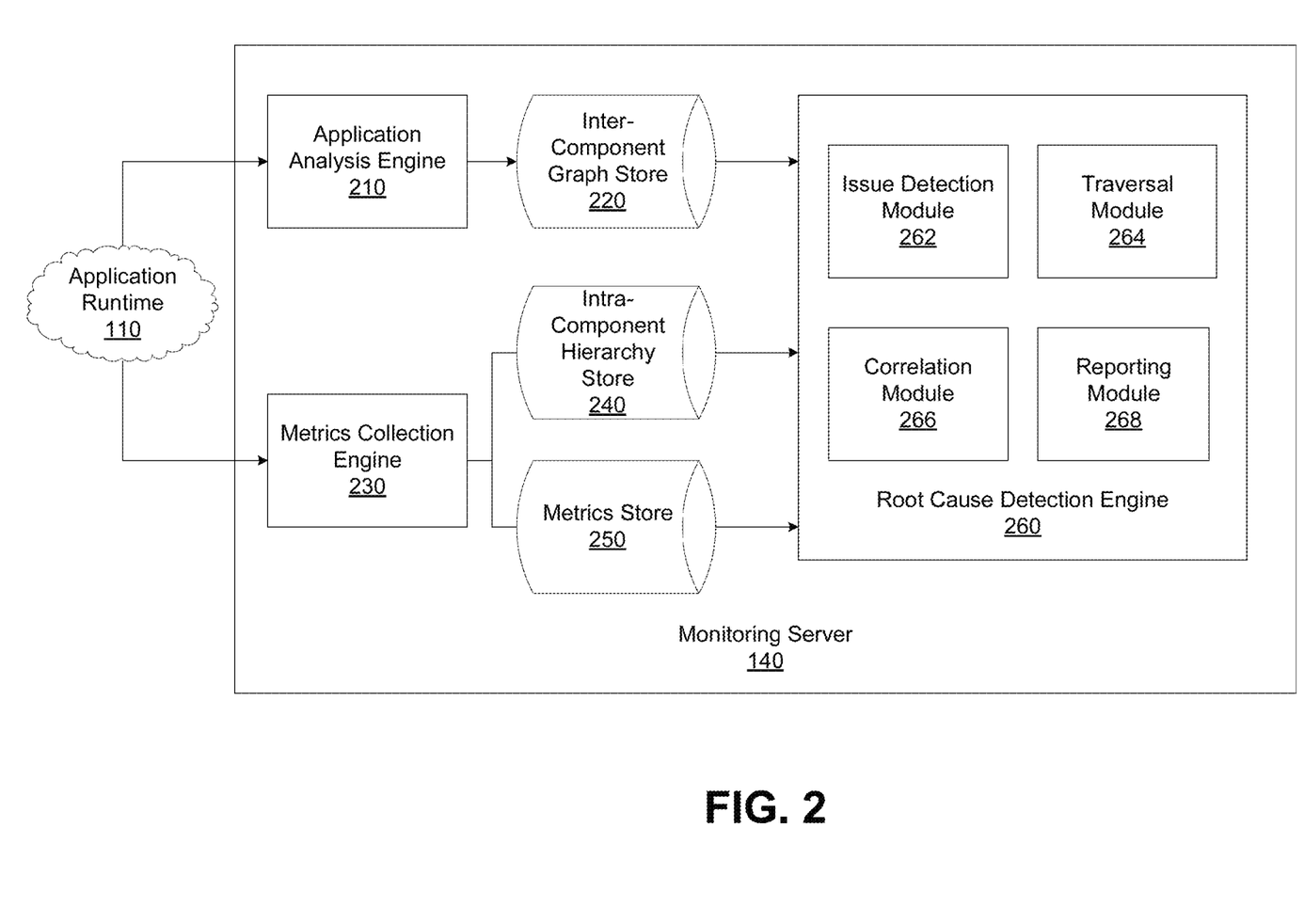
FIG. 2 is a block diagram illustrating various components in the monitoring server, according to one embodiment.

FIG. 2 is a block diagram illustrating various components in the monitoring server 140, according to one embodiment. As shown, the monitoring server 140 includes an application analysis engine 210, an inter-component graph store 220, an intra-component hierarchy store 240, a metrics store 250, and a root cause detection engine 260.

The graph store 220, the hierarchy store 240, and the metrics store 250 may each be, or include, one or more tables, one or more relational databases, and/or one or more multi-dimensional data cubes. Further, though illustrated as a single component, the graph store 220, the hierarchy store 240, and the metrics store 250 may each be a plurality of databases, such as a database cluster, which may be implemented on a single computing device or distributed between a number of computing devices or memory components. Further, the various modules and data stores included in the monitoring server 140 may be physically co-located within one computing system or, alternatively, may be disparately located across multiple computing systems.

The application analysis engine 210 generates inter-component graphs for different applications that are monitored by the monitoring server 140, and is one means for doing so. In operation, applications, such as application 115, may have several components that operate in conjunction. The application analysis engine 210 traces outbound and inbound requests to each of these components to generate an inter-component graph for an application that identifies how the various components are connected.

In one embodiment, the agent 120 adds a set of unique headers to outbound hypertext transfer protocol (HTTP) requests from the components of the application 115, such as browsers and backend services. The agent 120 monitors inbound requests on other components for these unique headers. When one of the unique headers added to an outbound request from component A is identified in an inbound request to component B, the agent 120 transmits a notification to the application analysis engine 210 indicating that component A is connected to the downstream component B. The application analysis engine 210 processes these notifications to build an inter-component graph of the application 115 that indicates the various connections and the associated direction of connectivity between components of the application. The inter-component graph extends from a user-facing component, such as a browser or user interface, to backend service components, such as payment processing, and finally to backend storage layers, such as caching and databases. The application analysis engine 210 stores the inter-component graphs in the inter-component graph store 220 (also referred to herein as the "graph store 220").

Figure 3:
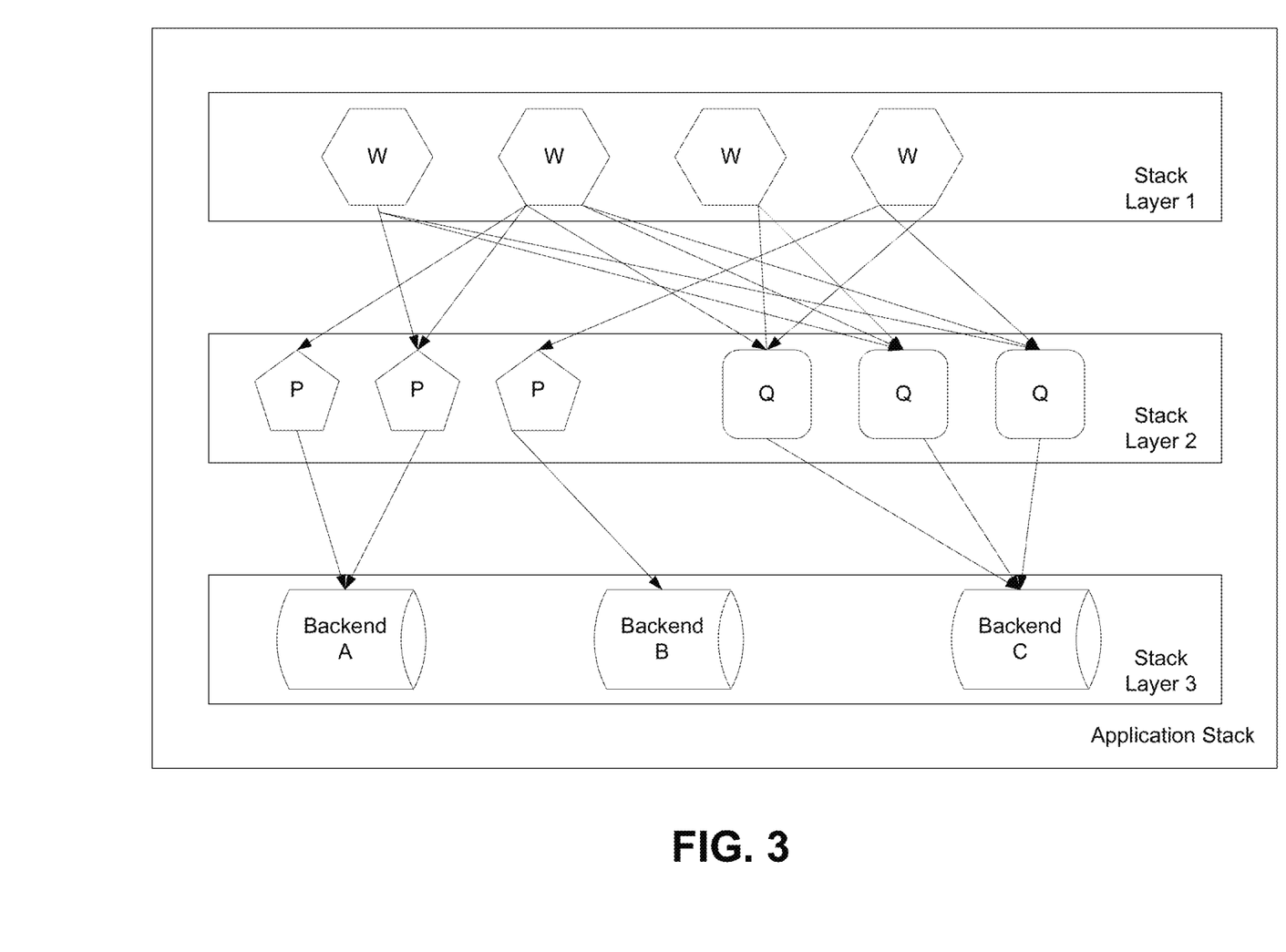
FIG. 3 illustrates an exemplary inter-component graph generated by the application analysis engine, according to one embodiment

FIG. 3 illustrates an exemplary inter-component graph generated by the application analysis engine 210, according to one embodiment. In the inter-component graph, the components marked as "W" are web interface components. The components marked as "P" and "Q" are services with application programming interfaces called by the "W" components that serve raw data from and store data to the databases marked as "Backend A," "Backend B," and "Backend C." In one embodiment, P may be a user information component and Q may be a shopping catalog component. Each API component, such as components P and Q, often has its own data store. Layer 1, at the top of the stack, represents data, services, interfaces, etc., that humans consume, layer 2, the middle of the stack, represents machine consumables (or APIs), and layer 3, the bottom of the stack, represents storage and other backend services.

Referring to FIG. 2 again, the metrics collection engine 230 aggregates metrics collected by the agent 120 at various levels of granularity, and is one means for doing so. The agent 120 receives metrics for each component of the application 115 and, further, for each method or operational unit within those components. These metrics may include the duration of execution measured in units of time and any errors encountered during execution. The metrics collection engine 230 aggregates the metrics to determine which methods in a component are called during a transaction, the number of times each method was called, and the total duration of each method when executed. The agent 120 may also determine an exclusive execution time of each method that has one or more children, which represents the amount of time the parent method executed without considering the execution time of the child methods or the amount of time the parent method was blocked while the child methods were executed.

The metrics collection engine 230 aggregates the received metrics to generate metrics time series for each component and sub-component of the application 150. A metrics time series specifies, for a given metric, the value of the metric for the associated component/sub-component at pre-determined time intervals. The metrics collection engine 230 stores the metric time series in the metrics store 250. The metrics collection engine 230 also generates an intra-component hierarchy for each component of the application 115. In particular, the intra-component hierarchy for a component identifies how various operational units, e.g., methods, data storage services, etc., in the component are connected. The metrics collection engine 230 stores the intra-component hierarchies in the intra-component hierarchy store 240.

Figure 4:
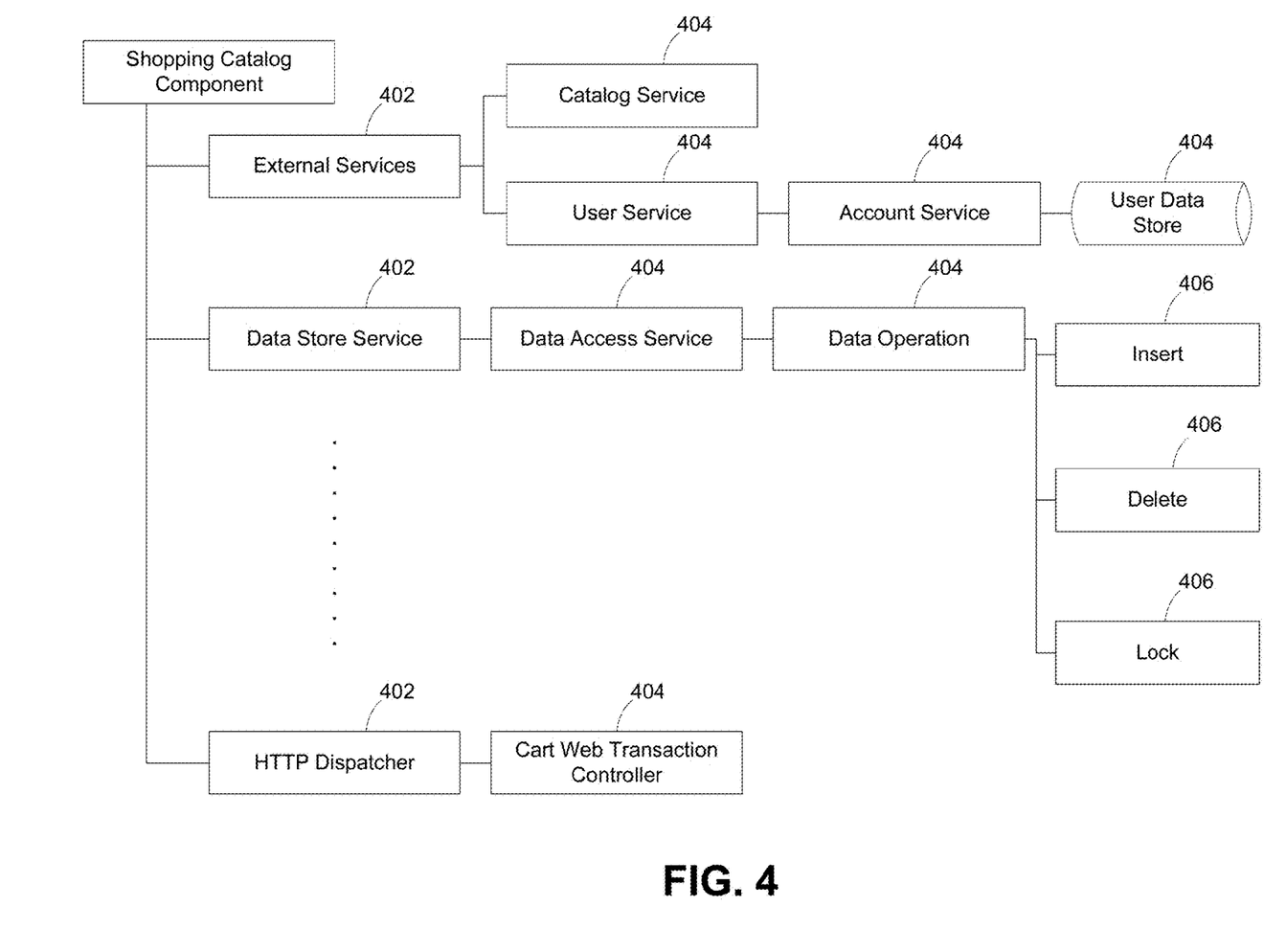
FIG. 4 illustrates an exemplary intra-component hierarchy of a single component Q of FIG. 3, according to one embodiment.

FIG. 4 illustrates an exemplary intra-component hierarchy of a single component Q of FIG. 3, according to one embodiment. In the intra-component hierarchy, the component Q includes many top level operational units 402 including "External Services," "Data Store Services," and an "HTTP Dispatcher." The top-level operational units 402 often have further lower-level operational units identified by the metrics collection engine 230. In the illustration, for example, the "External Services" is further componentized into a "Catalog Service," a "User Service," an "Account Service," and a "User Data Store." The intra-component hierarchy captures the relationships among the top level operational units 402 and the lower-level operational units 404.

Referring to FIG. 2 again, the root cause detection engine 260 detects issues that occurred during the execution of the application 115 and probabilistically determines the root cause of those issues, and is one means for doing so. The root cause detection engine 260 includes an issue detection module 262, a traversal module 264, a correlation module 266, and a reporting module 268.

The issue detection module 262 monitors metrics stored in the metrics store 250 to identify potential issues with the execution of the application 115, and is one means for doing so. An issue may be detected when a metric exceeds a threshold defined in the issue detection module 262. The threshold may be a configurable threshold determined based on historical performance of the application and/or components of the application. In one embodiment, the issue detection module 262 detects an issue when an execution time of the application or a component of an application exceeds a threshold. In another embodiment, the issue detection module 262 detects an issue when the number of errors that have occurred within a given duration of execution of the application or a component of an application exceeds a threshold. When the issue detection module 262 detects an issue, the issue detection module 262 raises an alert to the traversal module 264. The alert identifies the application and/or the component of the application for which the issue was detected.

The traversal module 264 traverses the inter-component graph and intra-component hierarchies associated with the application to identify the root cause of the issue detected by the issue detection module 262, and is one means for doing so. In operation, the traversal module 264 listens for alerts raised by the issue detection module 262. When an alert is raised, the traversal module 264 identifies the application for which the issue was detected and retrieves the inter-component graph and the intra-component hierarchies associated with that application from the graph store 220 and the hierarchy store 240. For a given issue, the traversal module 264 traverses the inter-component graph and the intra-component hierarchies to determine the possible execution paths that may have been the cause of the detected issue. The traversal module 264 transmits requests to the correlation module 266 to compare the metrics time series of the different components in the execution path with the detected issue. In one embodiment, the traversal module 264 iteratively fetches metrics time series of the components and sub-components identified in the execution paths based on the results of the comparison by the correlation module 266.

The correlation module 266 compares metrics time series with the issue metric to identify correlations between execution patterns, and is one means for doing so. In one embodiment, the Pearson product-moment correlation coefficient is used to compare these two time series. Assume the issue response duration metric time series is the dataset {x1, . . . , xn} containing n values and a possible sub-component duration metric time series is the dataset {y1, . . . , yn} also containing n values. The formula for the correlation coefficient r is defined as:

$$r = r_{xy} = \frac{\sum_{i=1}^{n}(x_i - \bar{x})(y_i - \bar{y})}{\sqrt{\sum_{i=1}^{n}(x_i - \bar{x})^2} \sqrt{\sum_{i=1}^{n}(y_i - \bar{y})^2}}$$

where $\bar{x}$ and $\bar{y}$ are respective sample means. An r value of 1.0 represents a perfect correlation, 0.0 represents no correlation and −1.0 represents a perfect negative correlation. The same equation can be applied to error rate metrics by replacing the duration metric time series with the number of errors observed per unit of time. If a sub-component yields a high correlation to the issue metric, the algorithm repeats by calculating the correlations between the children of the sub-component and the issue metric.

The reporting module 268 generates reports for administrators of the application 115 that visually identify the root cause of the detected issues, and is one means for doing so. These reports may identify the execution path from the level where the issue was detected to the root cause. The reports may also specify a confidence level of the identified root cause in fact being the root cause of the issue.

Figure 5:
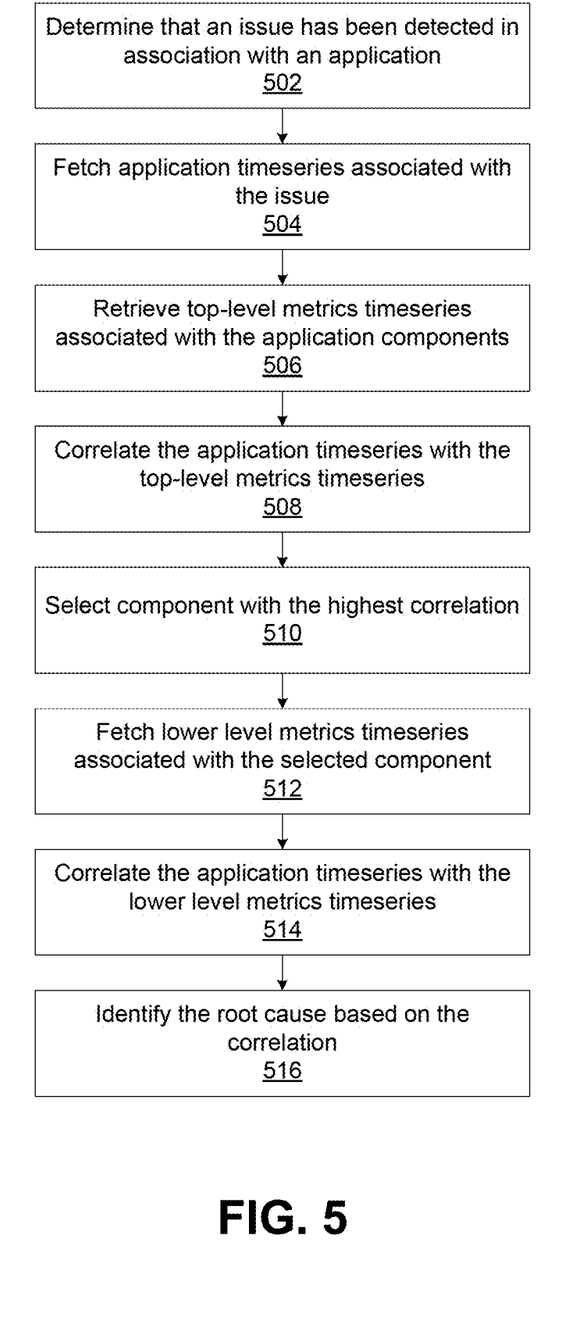
FIG. 5 is a flowchart of method steps for determining the root cause of an issue detected in association with an executing application, according to one embodiment.

FIG. 5 is a flowchart of method steps for determining the root cause of an issue detected in association with an executing application, according to one embodiment. Other embodiments may perform the steps of the process illustrated in FIG. 5 in different orders and can include different, additional and/or fewer steps. The process may be performed by any suitable entity, such as the root cause detection engine 260.

The root cause detection engine 260 determines 502 that an issue has been detected in association with an application during runtime. In one embodiment, an issue may be detected when a metric related to the performance of the application exceeds a threshold defined in the root cause detection engine 260. The threshold may be a configurable threshold determined based on historical performance of the application and/or components of the application.

The root cause detection engine 260 fetches 504 from the metrics store 250 the metrics time series associated with the application for which the issue has been detected (referred to as "the application metrics time series"). The application metrics time series indicates the value of a given metric at various points in time. For example, the response time metrics time series indicates the application response time at various points in time. In one embodiment, the detected issue typically manifests as an aberration in the metrics time series associated with the application.

The root cause detection engine 260 retrieves 506 top-level metrics time series associated with components of the application for which the issue has been detected. In particular, the root cause detection engine 260 analyzes the inter-component graph associated with the application to determine top-level components of the application to which the issue may be attributed. As discussed above, the inter-component graph for an application identifies how various components of the application are connected.

The root cause detection engine 260 correlates 508 the application metrics time series of the application with the top-level metrics time series associated with components of the application. The root cause detection engine 260 selects 510 the component having a top-level metrics time series that has the highest correlation with the application metrics time series.

The root cause detection engine 260 fetches 512 from the metrics store 250 lower-level metrics time series associated with the selected component. In particular, the root cause detection engine 260 analyzes the intra-component hierarchy associated with the selected component to determine operational units of the application to which the issue may be attributed. As discussed above, the intra-component hierarchy for a component identifies how various operational units, e.g., methods, data storage services, etc., in the component are connected.

The root cause detection engine 260 correlates 514 the application metrics time series of the application with the lower-level metrics time series associated with operational units of the selected component. The root case detection engine 260 identifies 516 as the root cause the operational unit having a lower-level metrics time series that has the highest correlation with the application metrics time series.

In one embodiment, an operational unit of the component may be an application associated with its own inter-component graph and intra-component hierarchies. In such an embodiment, the root cause detection engine 260 iteratively performs steps 506-514 until a root cause is identified. Further, if a top-level or lower-level metrics time series cannot be correlated with the application metrics time series, then the root cause detection engine 260 may search for correlations between metrics time series associated with web transactions, data stores, or other operational components and dependencies of the application.

Figure 6A:
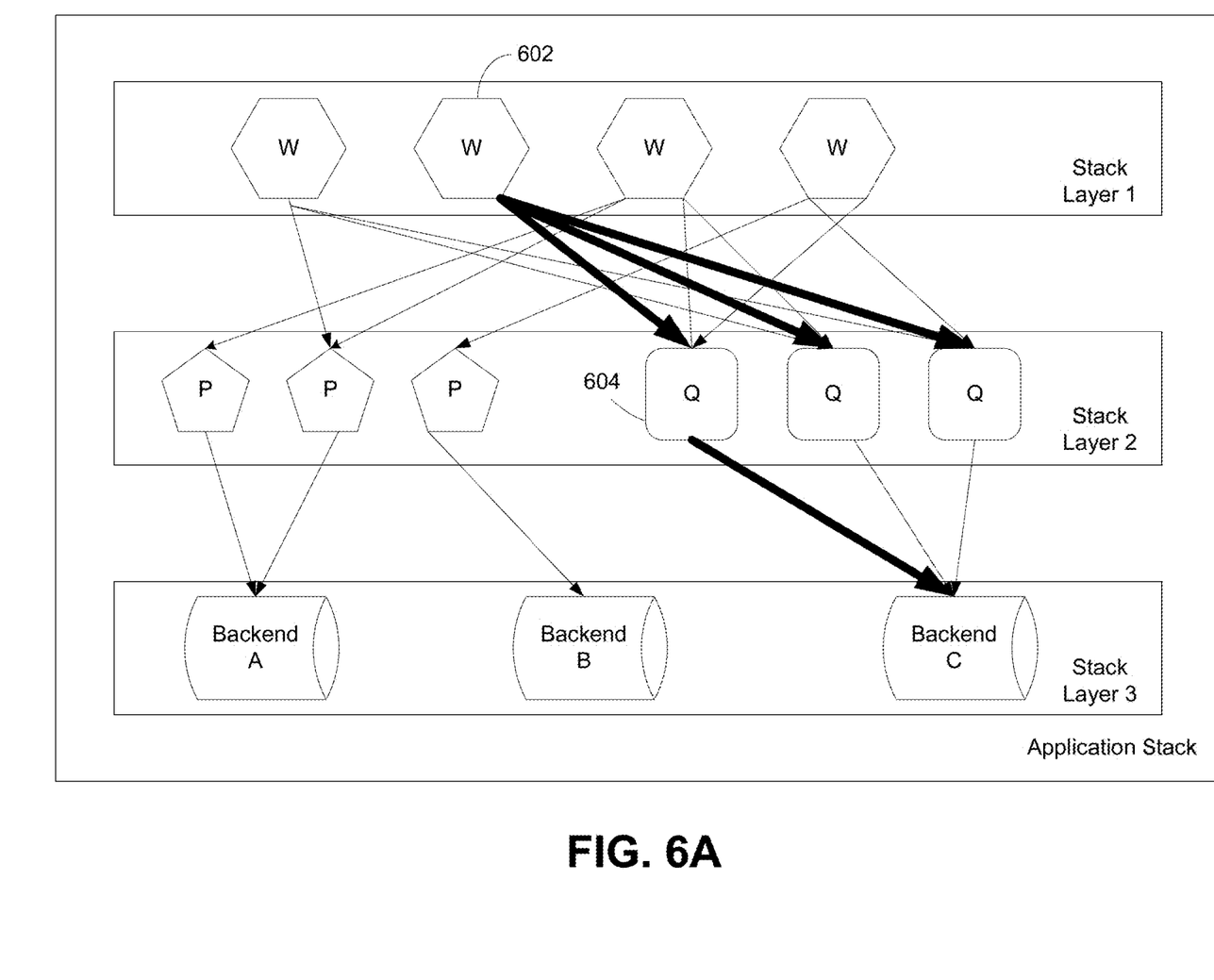
FIGS. 6A and 6B illustrate an exemplary traversal by the traversal module of the inter-component graphs and the intra-component hierarchy, according to one embodiment.
Figure 6B:
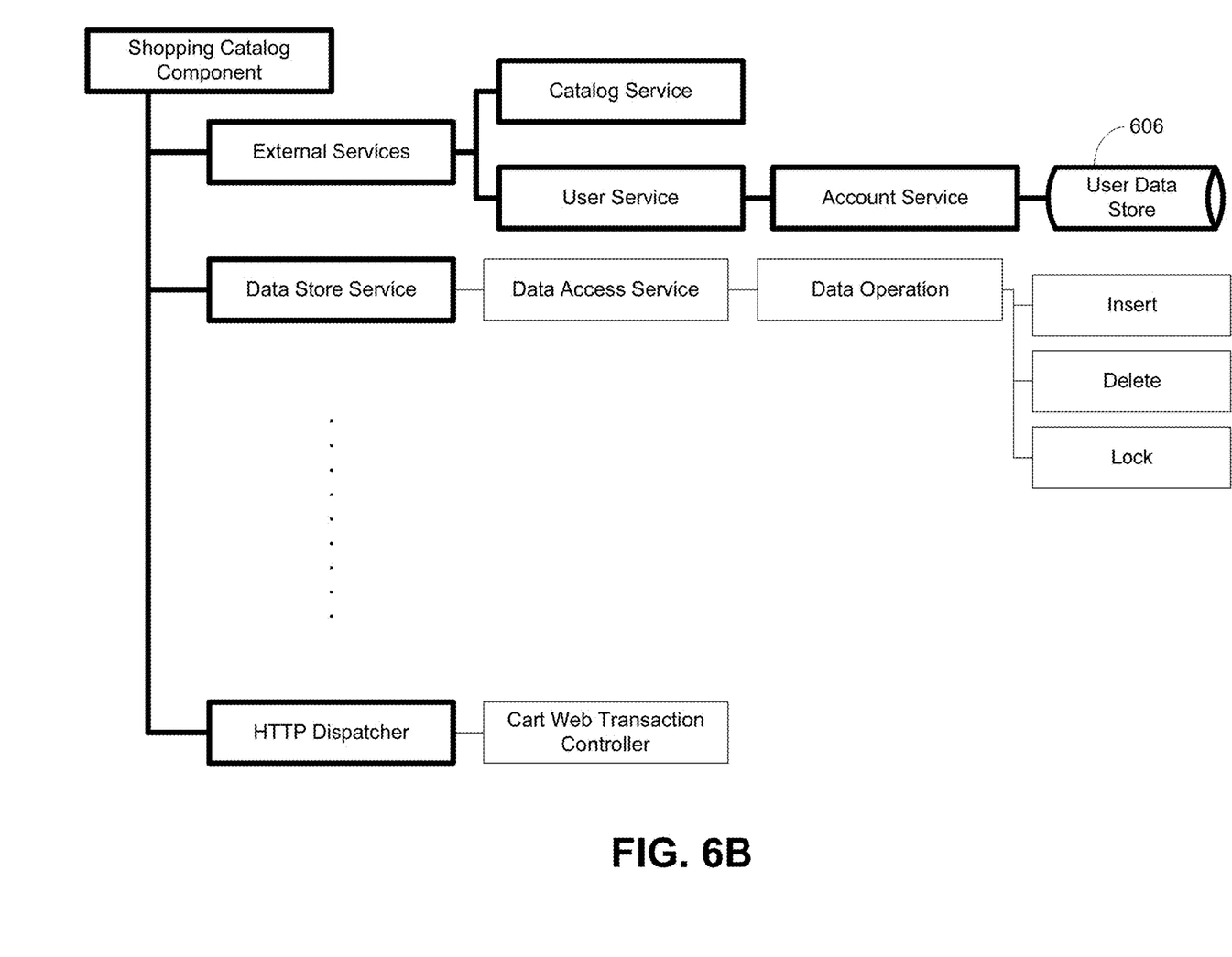

FIGS. 6A and 6B illustrate an exemplary traversal by the traversal module 264 of the inter-component graph and the intra-component hierarchy, according to one embodiment. Specifically, the traversal illustrated in FIGS. 6A and 6B illustrate the different execution paths that may cause an issue detected at the component 602 marked as "W." The traversal module 264 iteratively traverses the inter-component graph generated by the application analysis engine 210 to identify a set of components in lower layers of the application stack that are connected to the component 602. The set of components includes the three "Q" components in layer 2 of the application stack and the backend "C" component in layer 3 of the stack. The root cause detection engine 260 retrieves top-level metrics time series associated with components in the set of components. In the illustrated example, the root cause detection engine 260 correlates the metrics time series of the component 602 with the top-level metrics time series associated with the components in the set and selects component 604 as having a top-level metrics time series with the highest correlation with the metrics time series.

As shown in FIG. 6B, the component Q includes many top level operational units including "External Services," "Data Store Services," and an "HTTP Dispatcher." The root cause detection engine 260 iteratively retrieves lower-level metrics time series associated with components the operational units. The root cause detection engine 260 correlates the metrics time series of the 604 with the lower-level metrics time series associated with the operational units and selects the operational unit having a top-level metrics time series with the highest correlation with the metrics time series as the root cause of the issue. In the illustrated example, root cause detection engine 260 determines that the user data store 602 is the root cause of the issue.

Figure 7A:
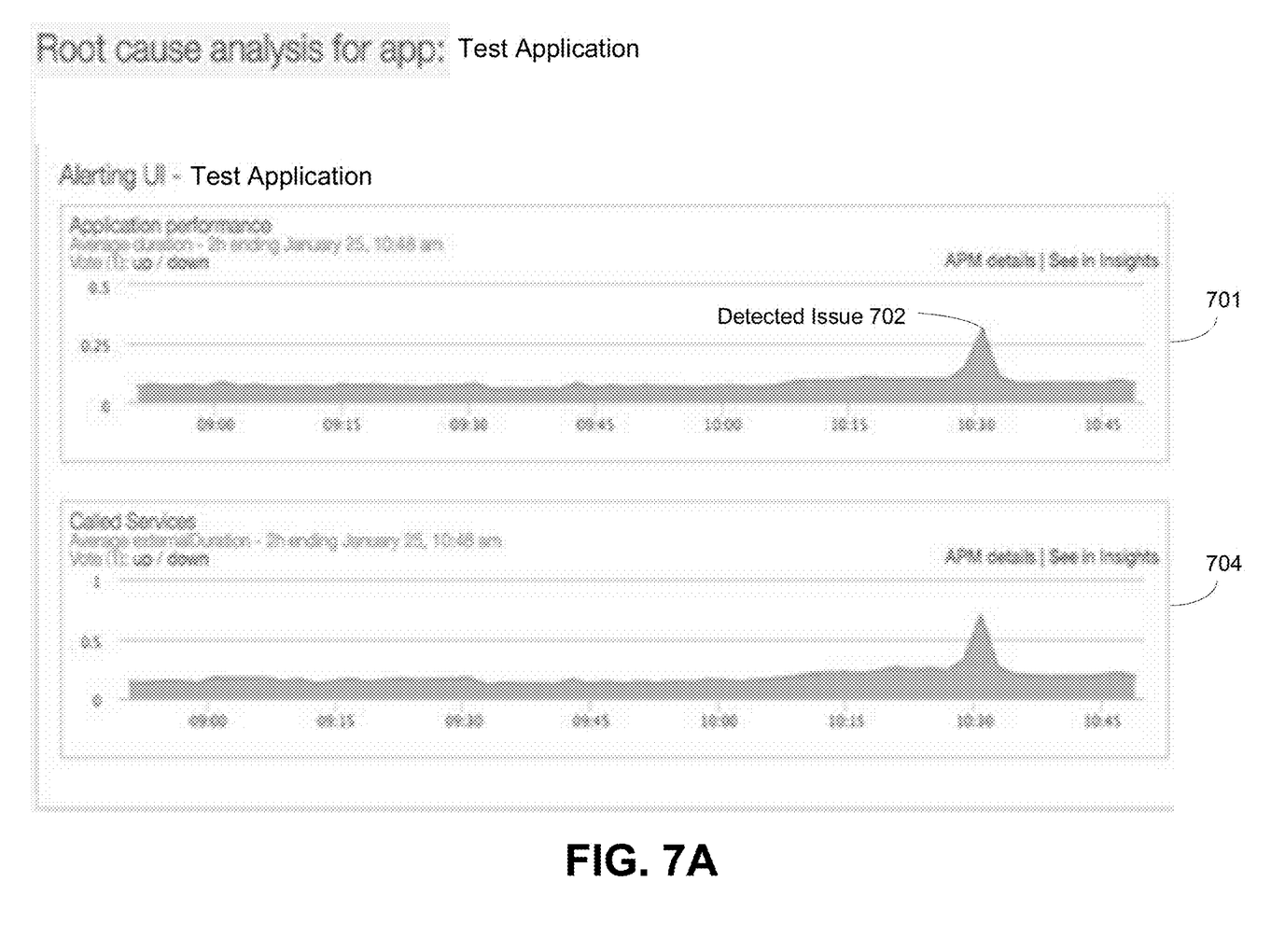
FIGS. 7A and 7B illustrate exemplary visualizations of metrics time series of different components of the application and how the metrics time series are correlated with a detected issue, according to one embodiment.
Figure 7B:
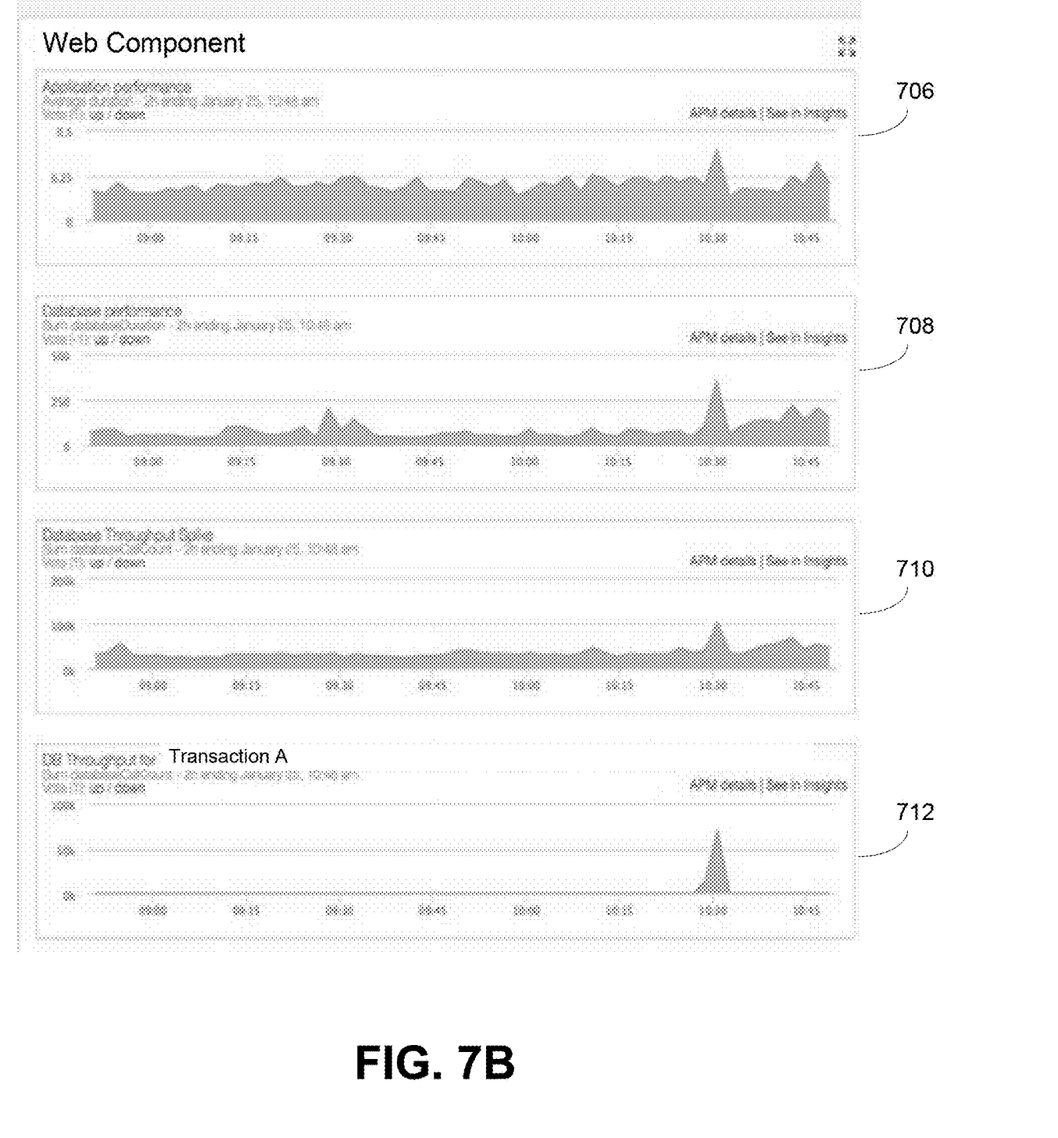

FIGS. 7A and 7B illustrate exemplary visualizations of metrics time series of different components of the application 115 and how the metrics time series are correlated with an issue metric, according to one embodiment. The visualization 701 of the application time series shows an anomaly in the values of the metric at 10:30 am. Such an anomaly is attributed to an issue 702 in the performance of the application. The visualizations 704-712 represent various metric time series associated with components and sub-components of the application 115. As shown in visualization 708, the detected issue 702 can be correlated with the database performance. The root cause detection engine 260 evaluates the time series associated with the sub-components of the database to identify transaction A represented by time series 712 as being the root cause of the issue 702.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the disclosure may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments of the disclosure is intended to be illustrative, but not limiting, of the scope of the invention.

We claim:

1. A method for identifying a root cause of an execution issue related to a software application, the method comprising:

identifying a degradation of a performance metric during an execution of a software application in an application stack, the application stack having a plurality of hierarchically organized layers that each includes one or more components;

traversing an inter-component graph corresponding to the software application to identify a hierarchy of components that were instantiated during the execution, the inter-component graph representing connections between different components of the software application, the hierarchy of components including a first component and a second component of the application stack;

determining, for the first component and the second component, a correlation factor representing a quantification of a similarlity in the degradation of the performance metric to a metrics time series for the component, the metrics time series specifying one or more values of the metric for the component during the execution of the software application;

selecting the component having the highest correlation factor as a cause of the degradation of the performance metric; and reporting the selected component as the cause of the degradation of the performance metric.

2. The method of claim 1, wherein the degradation is indicative of an execution issue occurring during runtime of the software application.

3. The method of claim 1, further comprising:

generating the inter-component graph using requests originating from the different components of the software application.

4. The method of claim 1, wherein determining the correlation factor representing the quantification of the similarity in the degradation of the performance metric to the metrics time series for the component further comprises:

comparing one or more values in an execution time series representing the degradation of the performance metric with one or more values in the metrics time series.

5. The method of claim 1, further comprising:

for each component of the plurality of hierarchically organized layers, traversing an intra-component graph to identify a hierarchy of a plurality of sub-components that were instantiated during the execution of the component, the intra-component graph representing connection between the plurality of sub-components for the component.

6. The method of claim 5, further comprising:

determining, for a first sub-component and a second sub-component of the plurality, another correlation factor representing another quantification of the similarlity in the degradation of the performance metric to a lower-level metrics time series for the sub-component, the lower-level metrics time series specifying one or more values of the metric for the sub-component during the execution of the software application; and
selecting the sub-component having the highest correlation factor as a root cause of the degradation of the performance metric.

7. The method of claim 1, wherein the first component and the second component are in a same layer of the plurality of hierarchically organized layers.

8. The method of claim 1, wherein the first component and the second component are in a first level and a second level of the plurality of hierarchically organized layers, respectively, and the first level is a higher level than the second level.

9. The method of claim 8, wherein selecting the correlation factor for the second component indicates a lower-level cause of the degradation of the performance metric.

10. The method of claim 8, wherein the first layer is a user-interface layer of the application stack and the second layer is an application programming interface of the application stack.

11. A non-transitory computer-readable storage medium comprising instructions for identifying a root cause of an execution issue related to a software application that, when executed by a processor, cause the processor to:
identify a degradation of a performance metric during an execution of a software application in an application stack, the application stack having a plurality of hierarchically organized layers that each includes one or more components;
traverse an inter-component graph corresponding to the software application to identify a hierarchy of components that were instantiated during the execution, the inter-component graph representing connections between different components of the software application, the hierarchy of components including a first component and a second component of the application stack;
determine, for the first component and the second component, a correlation factor representing a quantification of a similarlity in the degradation of the performance metric to a metrics time series for the component, the metrics time series specifying one or more values of the metric for the component during the execution of the software application;
select the component having the highest correlation factor as a cause of the degradation of the performance metric; and
report the selected component as the cause of the degradation of the performance metric.

12. The non-transitory computer-readable storage medium of claim 11, wherein the degradation is indicative of an execution issue occurring during runtime of the software application.

13. The non-transitory computer-readable storage medium of claim 11, wherein the instructions, when executed, further cause the processor to:
generate the inter-component graph using requests originating from the different components of the software application.

14. The non-transitory computer-readable storage medium of claim 11, wherein determining the correlation factor representing the quantification of the similarity in the degradation of the performance metric to the metrics time series for the component further causes the processor to:
compare one or more values in an execution time series representing the degradation of the performance metric with one or more values in the metrics time series.

15. The non-transitory computer-readable storage medium of claim 11, wherein the instructions, when executed, further cause the processor to:
for each component of the plurality of hierarchically organized layers, traverse an intra-component graph to identify a hierarchy of a plurality of sub-components that were instantiated during the execution of the component, the intra-component graph representing connection between the plurality of sub-components for the component.

16. The non-transitory computer-readable storage medium of claim 15, wherein the instructions, when executed, further cause the processor to:
determine, for a first sub-component and a second sub-component of the plurality, another correlation factor representing another quantification of the similarlity in the degradation of the performance metric to a lower-level metrics time series for the sub-component, the lower-level metrics time series specifying one or more values of the metric for the sub-component during the execution of the software application; and
selecting the sub-component having the highest correlation factor as a root cause of the degradation of the performance metric.

17. The non-transitory computer-readable storage medium of claim 11, wherein the first component and the second component are in a same layer of the plurality of hierarchically organized layers.

18. The non-transitory computer-readable storage medium of claim 11, wherein the first component and the second component are in a first level and a second level of the plurality of hierarchically organized layers, respectively, and the first level is a higher level than the second level.

19. The non-transitory computer-readable storage medium of claim 18, wherein selecting the correlation factor for the second component indicates a lower-level cause of the degradation of the performance metric.

20. A computer system, comprising:
a memory storing instructions for identifying a root cause of an execution issue related to a software application; and
a processor configured to execute the instructions, the instructions, when executed, causing the processor to:
identify a degradation of a performance metric during an execution of a software application in an application stack, the application stack having a plurality of hierarchically organized layers that each includes one or more components;
traverse an inter-component graph corresponding to the software application to identify a hierarchy of components that were instantiated during the execution, the inter-component graph representing connections between different components of the software application, the hierarchy of components including a first component and a second component of the application stack;
determine, for the first component and the second component, a correlation factor representing a quantification of a similarity in the degradation of the performance metric to a metrics time series for the component, the metrics time series specifying one or more values of the metric for the component during the execution of the software application;

select the component having the highest correlation factor as a cause of the degradation of the performance metric; and report the selected component as the cause of the degradation of the performance metric.

\* \* \* \* \*

UNITED STATES PATENT AND TRADEMARK OFFICE
CERTIFICATE OF CORRECTION

PATENT NO. : 11,169,897 B2
APPLICATION NO. : 16/658764
DATED : November 9, 2021
INVENTOR(S) : Cirne et al.

Page 1 of 1

It is certified that error appears in the above-identified patent and that said Letters Patent is hereby corrected as shown below:

In the Claims

In Column 10, in Claim 1, Line 32, delete "similarlity" and insert -- similarity --, therefor.

In Columns 10 and 11, in Claim 6, Lines 67 and 1, delete "similarlity" and insert -- similarity --, therefor.

In Column 11, in Claim 11, Line 43, delete "similarlity" and insert -- similarity --, therefor.

In Column 12, in Claim 16, Line 20, delete "similarlity" and insert -- similarity --, therefor.

Signed and Sealed this
Twenty-sixth Day of April, 2022

Katherine Kelly Vidal
*Director of the United States Patent and Trademark Office*